Oct. 30, 1962 — E. KIRCHNER — 3,060,554
CUTTING TOOL MOUNTING
Filed Sept. 14, 1959 — 3 Sheets-Sheet 1

INVENTOR
Egon Kirchner
BY Greer Maréchal, Jr.
ATTORNEY

Oct. 30, 1962 — E. KIRCHNER — 3,060,554
CUTTING TOOL MOUNTING
Filed Sept. 14, 1959 — 3 Sheets-Sheet 2
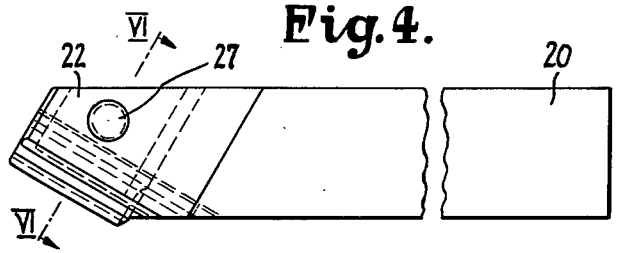
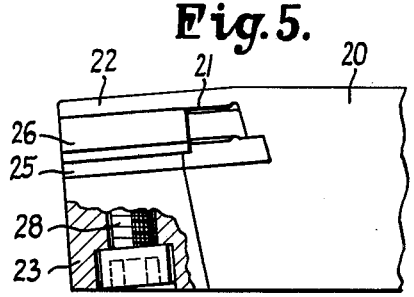
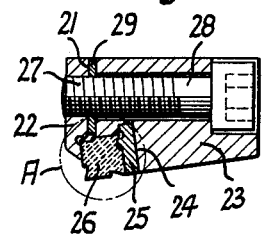
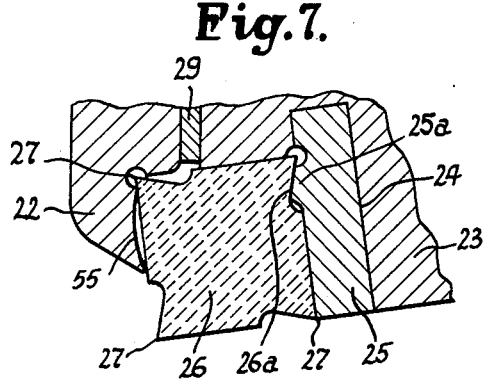
INVENTOR
Egon Kirchner
BY
Greer Marechal, Jr.
ATTORNEY Oct. 30, 1962 — E. KIRCHNER — 3,060,554
CUTTING TOOL MOUNTING
Filed Sept. 14, 1959 — 3 Sheets-Sheet 3
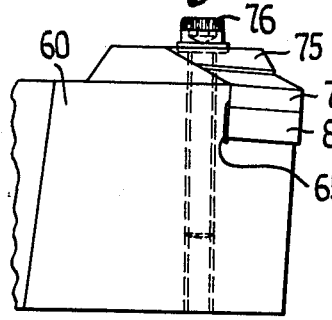
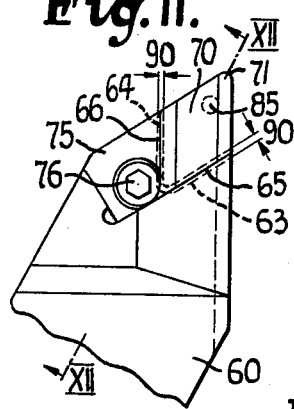
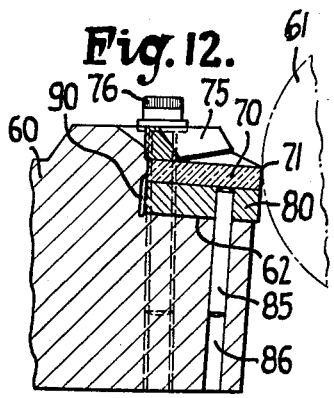
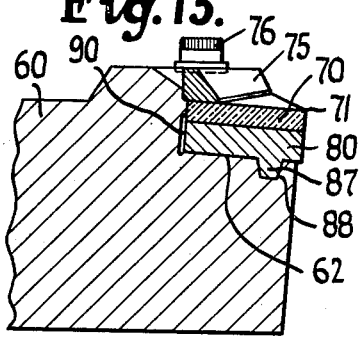
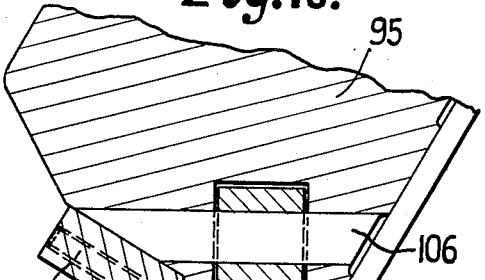
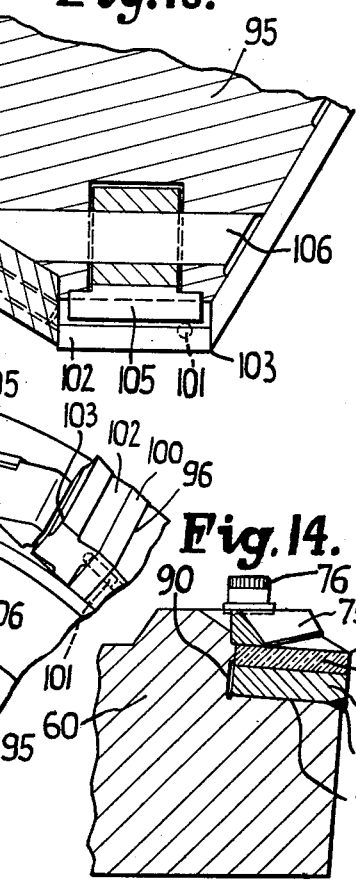
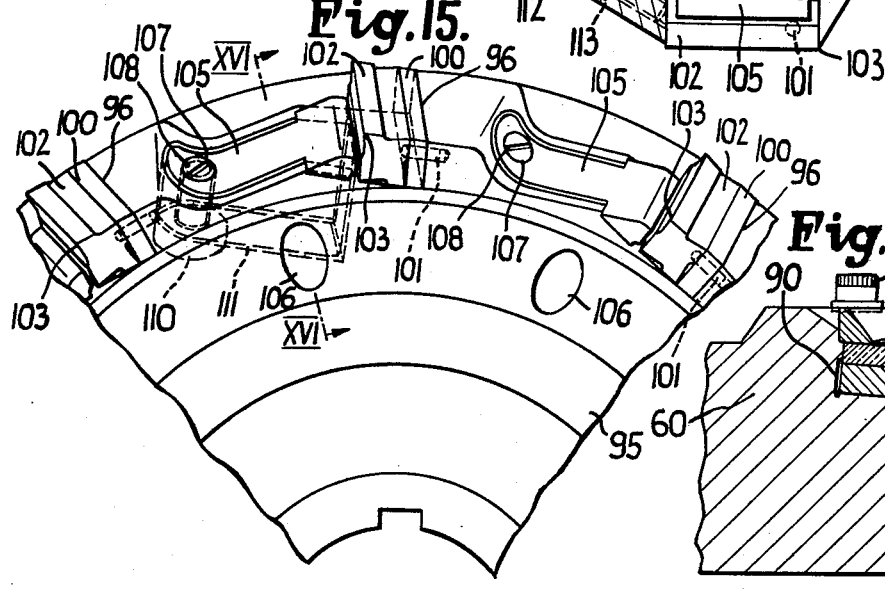
INVENTOR
EGON KIRCHNER
BY Greer Maréchal Jr.
ATTORNEY

United States Patent Office 3,060,554
Patented Oct. 30, 1962

3,060,554
CUTTING TOOL MOUNTING
Egon Kirchner, Augsburg, Germany, assignor to Maschinenfabrik Augsburg-Nurnberg, A.G., Augsburg, Germany, a corporation of Germany
Filed Sept. 14, 1959, Ser. No. 840,220
Claims priority, application Germany Oct. 27, 1956
4 Claims. (Cl. 29—96)

This invention relates to a cutting tool mounting and, more particularly, to a mounting or clamping device for a cutting tool, such as for use in a lathe and the like, where the cutting tip of the cutting tool is of a different material and exhibits appreciably different thermal expansion characteristics than the material of which the holder or mounting for the cutting tool and/or cutting tip is formed. This application is a continuation-in-part of my copending application Serial No. 685,559, filed September 23, 1957, and now abandoned.

As is well known, cutting tools for lathes and other similar devices are frequently provided having the cutting tip formed from a hard metal-ceramic or sintered ceramic material which is, for a number of reasons, formed in the shape of a more or less prismatic body and clamped in place by steel or other metal clamping or supporting surfaces of the tool holder. Such cutting tip materials may have a different coefficient of thermal expansion than the steel or other material from which the clamping jaws are conventionally made. Investigation has shown that, although the differences in thermal expansion may be slight, they may be sufficient to lead to a substantial decrease of the clamping forces as the cutting tool heats up during use to an extent at which the cutting tip may become loose, under the heat and pressure of use, so that a hammering or chattering of the tool or tip obtains. In such an event, of course, the cutting tip edges are substantially more rapidly worn; the brittle hard cutting material of the tip may be nicked or destroyed; and a much rougher cutting effect may be obtained.

The foregoing is particularly emphasized when it is realized that, frequently today, the cutting tip of a tool on a lathe operating on modern high-speed steels may, indeed, be heated, in operation as by friction, to temperatures as high as 600°–700° C. or more; and, if the cutting tip is made of a material of substantially less coefficient of thermal expansion than the steel or other material from which the tube holder is made, at such temperatures a substantial variation in clamping pressure, however originally produced, may obtain. Similarly, particularly with cutting tips as now widely used of the "throw-away" variety made of relatively inexpensive metal-ceramic materials which, when they become dull, are merely replaced and thrown away without resharpening; it becomes important to have an arrangement whereby the cutting tip can be readily replaced, when cold, at the lathe without removing the tool holder and sending it elsewhere for heating or welding or other operations and yet where, notwithstanding the ease of replacement at no more than slight clamping pressure when cold, the relationship of the amount of thermal expansion experienced throughout a temperature range all the way up to many hundreds degrees C. will still insure firm clamping at that high temperature notwithstanding the inevitable differences in thermal expansion of the material from which the cutting tip is formed and the different material from which the clamping jaws of the tool holder are formed.

According to this invention, however, a cutting tool having a replaceable cutting tip and a holder or clamping jaw arrangement for holding the cutting tip in operation are provided, each of which has a different coefficient of expansion and is such that the different thermal expansion characteristics of the cutting tip and the clamping jaws or holder are so controlled and/or equalized by means included in the clamping arrangement, particularly in the direction of the clamping forces, that firm clamping engagement of the cutting tip is maintained in use and substantially throughout the entire temperature range from room temperature up to the high operating temperature ranges which may be encountered. This invention also includes the utilization of expansion shims associated with the holder clamping jaws, the controlled thermal expansion characteristics of the jaws and the shims and the material of which they are made, means for rapid conduction of heat generated by the cutting operation from the cutting tip throughout and/or into the clamping jaws, and means for controlling the thermal expansion movement of such shims or jaws or tips in directions in accordance with or opposed to those of the clamping forces. In this way, firm clamping pressures are obtained throughout the temperature range encountered in operation and even though the various materials of which the cutting tip and clamping jaws and expansion means are made inherently possess different coefficients or extents of thermal expansion throughout the temperature range encountered.

With the foregoing and other objects and advantages in mind, all of which will be apparent from the following description, the accompanying drawings, and the appended claims, this invention will now be further set forth.

In the drawings—

FIG. 4 is a planned view of a cutting tool holder according to this invention and including an expansion shim and heat baffle;

FIG. 5 is a partial side view of the structure of FIG. 4;

FIG. 6 is a section along the line VI—VI of FIG. 4;

FIG. 7 is a view of the portion of FIG. 6 enclosed by the circle A, on a larger scale;

FIG. 10 is a tool holder embodying this invention in partial plan view;

FIG. 11 is a top plan view of the tool holder of FIG. 10;

FIGS. 12–14 are all similar views taken along the line XII—XII of FIG. 11 indicating various modifications of means for anchoring and accommodating expansion of an expansion shim without altering the positioning of the cutting edge;

FIG. 15 is a view similar to FIG. 9 and including a cutting tip similar to that in FIG. 7; and FIG. 16 is a partial section along the line XV of FIG. 15.

Figure 1:
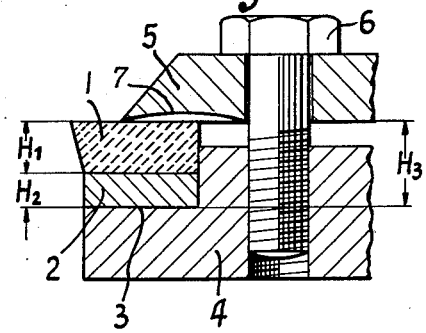
FIG. 1 is a partial section through a device embodying this invention and showing clamping jaws enclosing therebetween a cutting tip and an expansion shim.

Referring to the drawings, a cutting member tool holder is indicated in FIG. 1 as including a cutting tip or cutting blade edge insert 1 together with an expansion shim 2. Shim 2 is located in recess 3 in or associated with lower jaw 4 of a tool holder, and both shim 2 and cutting tip 1 are clamped between movable clamping jaw 5 and lower stationary member or clamping jaw 4 of the tool holder, with means, such as clamp screw 6 or other known means, urging the two clamping jaws 4 and 5 together.

As noted in FIG. 1, the cutting tip itself, which may be of any suitable material but, preferably, of a metallic-ceramic material having a different coefficient of thermal expansion from that of, for example, the tool holder clamping jaws 4, 5 has a thickness or height which may be indicated, as on the drawing, by the figure $H_1$. For example, the composition of the cutting tip 1 may include such materials as a carbide alloy of tungsten carbide, titanium carbide and cobalt with an average coefficient of thermal expansion of $a_1 - 6 \times 10^{-6}$; and the two holder clamping jaws 4, 5, may consist of a different material, for example, steel with an average coefficient thermal expansion of the order of $a_{st} - 12.6 \times 10^{-6}$. Expansion shim 2 has a height or thickness which may be noted as $H_2$, and the combined heights of cutting tip 1 and expansion shim 2, as noted in the drawings, $H_3$.

According to this invention, then, the material and height or thickness of expansion shim 2 is particularly selected to have such a coefficient of expansion different from those of either cutting tip 1 or clamping jaws 4, 5 by an amount such that, as the temperature of the entire assembly is raised during the operation by the work or frictional effect of cutting tip 1 in cutting whatever work piece is being treated, the combined thermal expansion extents of cutting tip 1 and expansion shim 2, in aggregation, and the thermal expansion increases in the height or thickness $H_1$ or $H_2$ are as least equal to the change in the thickness $H_3$ of the spacing between the respective surfaces of clamping jaws 4, 5. As an example of satisfactory materials for expansion shim 2 in the illustrated embodiment are brass, nickel, bronze, austenitic steel, etc., as substances having coefficients of thermal expansion coordinated with the conventional steel of tool holder clamping jaws 4, 5 and the carbide cutting tip 1, as well as having suitable hardness and durability in use. As will be understood, shim 2 may conventionally be soldered or otherwise affixed to cutting tip 1 or, preferably, the lower jaw portion 4 of the tool holding clamping jaws 4, 5, as is described in detail hereafter.

Figure 2:
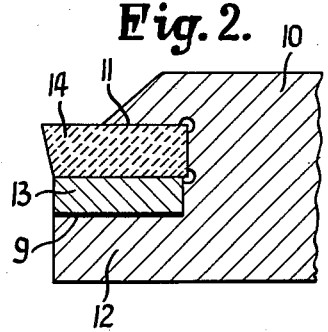
FIG. 2 is a partial section through a device embodying this invention and having other means provided for applying the clamping pressure.
Figure 3:
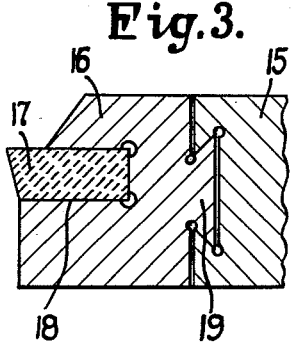
FIG. 3 is a partial section through a similar device including means other than an expansion shim for providing the thermal expansion characteristics desired.

In the embodiment illustrated in FIG. 2, a tool holder 10 is provided with a recess 11 of the lower jaw 12 in which is soldered or otherwise affixed an expansion shim 13 as indicated by a layer of solder 9. As previously discussed, the thickness of expansion shim 13 is such that the space between the upper surface thereof and the top clamping jaw defining recess 11 is of such size that the cutting tip 14 can just barely be inserted at room temperature for sliding clamping fit. As noted above, the material of which shim 13 is made is selected to have a coefficient of thermal expansion which, when coordinated with the coefficient of thermal expansion of tool holder 10, maintains and/or increases the clamping pressure within recess 11 as the temperature of the cutting tip 14 rises during operation of the tool—i.e., the coefficient of thermal expansion of shim 13 is so selected with regard to the coefficient of thermal expansion of cutting tip 14 and tool 10 that, as the temperatures of these parts rise during operation, the thickness of shim 13 will increase at least as rapidly or more rapidly than the thickness or recess 11 to maintain cutting tip 14 firmly clamped into holder 10. If it is desired to eliminate the expansion shims such as 2 and 13 for certain particular compositions of cutting tools or cutting tips, a structure is provided, as illustrated in FIG. 3, in which tool holder 15 has a removable head 60 affixed to a base 15 as by the dovetailed tongue-and-groove connection. Head 16 includes in an outer edge thereof a recess 18 in which cutting tip 17 is mounted. The thickness of recess 18 is such that the cutting tip can just barely be inserted with sliding clamping pressure at room temperature, and the head 16 is made from a material which has substantially the same thermal expansion, or a lesser thermal expansion, as the material from which the cutting tip 17 is made. In an arrangement such as this, the cutting tip 17 reaches in operation a higher temperature than the head 16, with, of course, greater thermal expansion insuring an increasingly tight clamping fit. As illustrative of a satisfactory material for head 16, nickel-steel alloys containing 30% to 42% nickel are preferred, as Invar steel, Indilatans, etc. Furthermore, the operating temperature of the head 16 can be somewhat further controlled by the dimensioning of the cross section of dovetailed tongue-and-groove connection 19 of which, as will be understood, the rate of conduction of heat from head 16 into holder or base 15 is a function.

As will be understood, the source of heat for raising the temperature of these structures in causing heat expansion therein is the cutting action of the outer cutting edge of the tip 1, 14, 17, etc., in contacting or cutting whatever material is being cut. The rate of heat transfer from the tips into the clamping jaws and/or tool holders is a function of, among other things, the contact pressure of the heat transfer surface. Preferably, then, to assure a dependable thermal expansion and maintain the desired clamping, the contact pressure at operating temperatures (which may be as high as 600°–700° C. or more) should be as equal as possible over the entire clamping surface. This preferred arrangement also affords the additional advantage of providing a uniform surface pressure resulting from a purely mechanical load on the cutting tips. To achieve this, the surfaces in contact with cutting tips 1, 14, 17, etc., are preferably made concave in order to take into account the smaller thermal expansion occurring at the edge zones where a greater amount of heat is removed by the cooling effect of the surrounding air. This is illustrated, on an exaggerated scale, in FIG. 1 by the concave surface 7 and in FIG. 7 by concave surface 55, although it is to be understood that the depth of the concavity may, indeed, be of but a few hundredths of a millimeter, and it is also to be understood that this concave surface feature in accordance with this invention is equally applicable and to be applied to the corresponding meeting surfaces of the embodiments of this invention illustrated and other than that illustrated merely in FIGS. 1 and 7. For example, if the contacting surfaces were planer at room temperature, a convex curvature would occur in operation due to the cooling effect of the air at edges and the thermal expansion of the central portion of such surfaces, so that clamping pressures in the center areas would be greater than at the edges, and this is avoided by the preferred structure of making the surfaces originally concave, although the extent or depth of such concavity is minute, or even, microscopically invisible.

FIGS. 4–7 illustrate in several views a cutting tool holder for a lathe as including a tool holder 20 and cutting tip 26 set at an angle with respect to holder 20. Holder 20 is provided with a deep slot 21 defining upper and lower clamping jaws 22 and 23. Lower jaw 23 has associated therewith or therein a recess 24 into which is fitted cutting tip 26 and an expansion shim 25 with tip 26 having a substantially square cross section. Clamping of tip 26 and expansion shim 25 is effected by clamping screw 28 threadably engaged at 27 with upper jaw 22, and shim 25 is provided to give the aforementioned co-relation of thermal expansion movement to maintain a firm clamping pressure throughout raised operating temperatures. In this structure also a sheet metal disc 29, consisting of a metal of high thermal conductivity, such as aluminum or copper, is preferably inserted in slot 21 to increase the flow of heat away from the edges of jaw 22 and control to some extent the rise in temperature thereof.

As will be understood, the illustrated construction has the further advantage that cutting tip 26 is provided with a plurality of cutting edges 27 which can sequentially be put in operation merely by loosening screw 28 and rotating cutting tip 26 to increase the life and continued operation of the tool. This construction is particularly advantageous with the "throw-away" type of ceramic-metallic cutting tip previously mentioned which is utilized until dull and then simply thrown away without re-sharpening, since, with a cutting tip shaped as in FIG. 7, a plurality of cutting edges may be formed on the single cutting tip for rotation thereof prior to throwing away the entire tip. Also, with this construction a ledge 25a is preferably provided on the expansion shim 25 designed for engagement with an accommodation of a corresponding surface 26a at each corner of the cutting tip 26 for firmly clamping and self-alignment of the cutting tip in any of its various angular positions.

Figure 8:
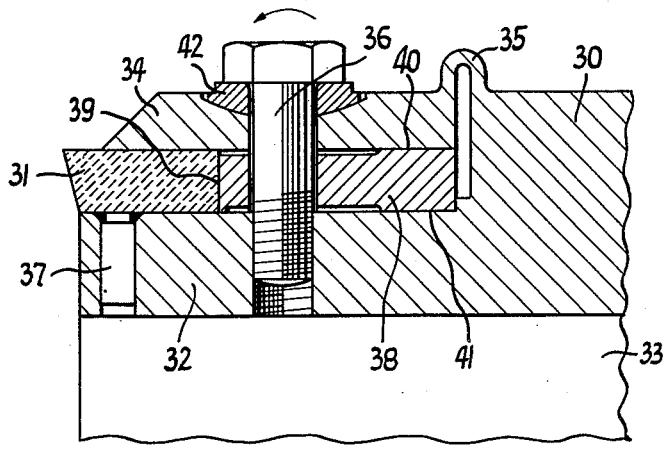
FIG. 8 is a clamping jaw arrangement embodying this invention with heat deflecting and flow controlling means for the expansion and associated with one of the clamping jaws.

In the arrangement illustrated in FIG. 8, the differences in thermal expansion of the tool holder 30 and cutting tip 31 are compensated for primarily by control of heat flow from the tip into the clamping jaws, as with the other embodiments of this invention, but, here, the tool holder 30 includes a lower jaw 32 supported on a rigid base 33 and an upper clamping jaw 34 which is resiliently connected to tool holder 30 as by a bend 35. A clamping bolt 36 provides clamping pressure between upper jaw 34 and lower jaw 32.

Near the outer edge of lower jaw 32 is provided one or more pins 37 consisting of the material of high heat conductivity such as copper and having the upper ends thereof directly contacting cutting tip 31. By virtue of copper conducting pins 37, heat is directly and rapidly conducted from cutting tip 31 into the outer portion of jaw 32, the temperature of which rises, consequently, more quickly than the other parts of the device. Since jaw 32 is prevented from downward expansion by base 33, greater expansion of jaw 32 in the upper direction is obtained with increased clamping pressure against cutting tip 31, thus in this construction there is associated with one of the clamping jaws 32 or 34 means for equalizing or controlling thermal expansion movement for the purpose of maintaining or increasing the clamping pressure of jaws 32 and 34 on cutting tip 31 as the temperature of tip 31 increases during operation thereof. Also, in the space behind cutting tip 31 and between jaws 32 and 34, there is preferably provided a heat conducting member 38 in direct contact with the surface 39 of cutting tip 31. Member 38 also directly contacts jaws 32 and 34 at the right end thereof in the drawing, along the surfaces 40 and 41. Member 38 is also selected of a material having high heat conductivity so that heat generated in cutting tip 31 is rapidly conducted by member 38 directly to the right hand or inner ends of jaws 32 and 34. Thus extra heating of jaws 32 and 34 in the areas 40 and 41 causes thickening of the jaws at these points and resultant tilting of the outer end of jaw 34 downwardly in the direction of the arrow in FIG. 8 to provide, by means associated with the clamping jaws as the expansion shims are therewith associated in other modifications of this invention, into exerting a stronger clamping force on cutting tip 31 as the temperature thereof rises in operation. Preferably, in order to facilitate this tilting movement, a convex bushing 42 is provided between the head of bolt 36 and jaw 34. It is to be understood that the foregoing heat expansion compensating and controlling means are equally applicable to other embodiments of this invention as are the concave surfaces 7 applicable to the structures of the other figures and that repeated showings thereof are eliminated only for simplification of the drawings.

Figure 9:
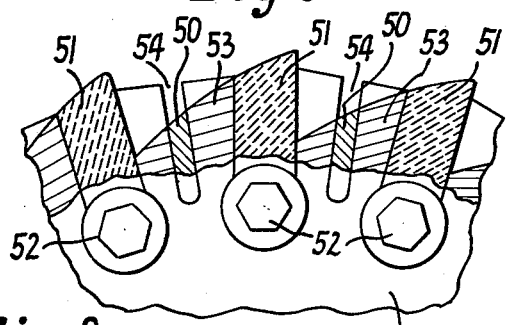
FIG. 9 is a partial plan view of a milling tool head with clamping arrangements including expansion shims embodying this invention.

The structure shown in FIG. 9 is illustrative of the application of this invention to a multi-cutting tool such as, for example, would be used on a milling machine, and includes a tool holder 49 into which a plurality of cutting tips 51 are affixed by known fastening means indicated in 52. Cutting tips 51 include backed-off shoulders 53 provided with longitudinal slots 54 in each of which is positioned an expansion shim 50 having a greater coefficient of expansion than the material of which shoulders 53 are made. In this manner, the tangential component of cutting pressure is substantially taken up by shoulders 53, and the greater expansion of shims 50 insures increased clamping pressure of the various tips 51 under operating conditions.

In some instances with various cutting tools embodying this invention, it may be found that the thermal expansion movements in accordance with this invention provide some slight displacements of the cutting tip of the cutting tool toward the workpiece, so that some manual compensation must be made, for example in a lathe, for such expansion movement upon prolonged operation of the cutting tip to assure that the final diameter of the workpiece is formed according to specifications. It is believed that such difficulties maybe, perhaps, stem from the fact that the thermal expansion movement of the expansion shim is greater than the thermal expansion movement between the cutting tip and the clamping jaws, so that the cutting tip, while being more firmly clamped vertically, is also expanded or moved horizontally with respect to the workpiece.

Accordingly, as a further feature of this invention, it is preferred that the expansion shim (e.g., 2, 13, 25, and the equivalent numbers in the figures yet to be described, etc.) be anchored or positively connected to at least one of the tool holder clamping jaws (e.g., 4—5, 11—12, 32—34, 22—23, etc.) at the outer end thereof adjacent the workpiece, and that the inner or opposite end of the expansion shims be provided with an expansion space or expansion joint to accommodate the horizontal expansion of the shim as is a necessary concomitant with the desired vertical expansion thereof, while yet not horizontally misaligning the cutting tip itself beyond the tolerances desired. Also, with regard to horizontal expansion of the cutting tip, it is preferred to provide stop surfaces or abutments which limit the horizontal expansion thereof without, as will be understood, limiting the corresponding and greater thermal expansion of the expansion shim. The foregoing added advantages of this invention may be, perhaps, most readily illustrated by reference to FIGS. 10–14.

Referring to FIG. 10, there is shown a tool holder arm 60 (which may be considered, for purposes of this description, generally equivalent to the previously described tool holder arms 4—5, 10, 15, 20, 30, etc.,) in which is provided, at the end thereof adjacent the workpiece (indicated generally in FIG. 12 at 61), a recess defined essentially by a base surface 62 and vertical wall or abutment surfaces 63 and 64, along with distending abutments 65 and 66.

A replaceable cutting tip 70, having a cutting edge or corner at 71 for cutting action against a workpiece such as 61, is positioned in the recess just described in tool holder 60, and is held in place by a movable clamping jaw 75, held in clamping relation by known means as, for example, a bolt 76. It should be noted that bolt 76 is positioned, with respect to the cutting edge 71 of cutting tip 70, spaced and remote from said cutting edge 71.

As previously noted in accordance with structures embodying and for practicing this invention, an expansion shim 80 is also positioned in the recess previously described in tool holder 60 and in a position spaced from clamping jaw 10 by cutting tip 70. That is, as bolt 76 is tightened to bring clamping pressure on to clamping jaw 75, cutting tip 70 is, thus, clamped between clamping jaw 75 and expansion shim 80 so that, as previously noted, the relative expansions of cutting tip 70 and expansion shim 80, together, accommodate the different extents of thermal expansion between clamping jaw 75 and clamping surface 62 in order to maintain the pre-set or initial clamping pressure between clamping jaw 75 and surface 62 notwithstanding a substantial temperature rise in cutting tip 70 and substantial differences in the extents of thermal expansion of cutting tip 70, expansion shim 80, and clamping jaws 75 and 62.

As will be noted from FIGS. 10-14, expansion shim 80, in addition to being compressed by bolt 76 and clamping jaw 75 against cutting tip 70 and surface 62 of tool holder 60, is also anchored against horizontal movement adjacent that edge of expansion shim 80 most closely corresponding with the cutting edge 71 of cutting tip 70 (and, consequently, adjacent the point of greatest heating of cutting tip 70). As noted in FIGS. 12-14, there are a number of different expedients for accomplishing this function, once the concept has been recognized that it is desirable to limit the horizontal expansion of expansion shim 80 in one direction or at one extremity thereof. For example, according to FIG. 12, expansion shim 80 is provided with a bore 84, at the end thereof adjacent the cutting edge 71 of cutting tip 70, into which fits a pin 85, accessible through and leading into a bore 86 into holder 60. According to FIG. 13, expansion shim 80 includes a depending key or lug 87 adjacent the end thereof close to or corresponding to cutting edge 71 of cutting tip 70, which is fabricated to fit into a corresponding recess 88 in the lower clamping jaw or body of tool holder 60, as by weld 89, also adjacent the end of expansion shim 80 most closely related with the cutting edge 71 of cutting tip 70.

As will be understood from the foregoing, all of these various expedients, for anchoring the horizontal thermal expansion movement of expansion shim 80 adjacent the outer or cutting tip edge thereof against horizontal movement in a direction toward the workpiece 61, have the effect of limiting the horizontal thermal expansion movement of expansion shim 80 (and, perhaps, cutting tip 70) so that the desired large thermal expansion movement of expansion shim 80 for the purpose of maintaining the vertical clamping engagement of cutting tip 70 as described will be horizontally limited to a direction away from or, at least, not inconsistent with, the particular setting of the cutting edge 71 of cutting tip 70 with respect to the workpiece 61.

As a further aid to the foregoing object, as will be noted from, particularly, FIGS. 10-14, in some detail, the abutment surfaces against which cutting tool 70 rests as clamped in place (e.g., surfaces 63 and 64) distend or extend somewhat beyond the recess provided for expansion shim 80. Although this distension is, perhaps, somewhat exaggerated in the drawings for clarity, certain gaps 90 may be noted between the cold-start edges of expansion shim 80 most remote from the cutting edge 71 of cutting tip 70. These gaps 90, at the edges of expansion shim 80 most remote from the cutting edge 71 of cutting tip 70, in association with the specific anchoring of expansion shim 80 adjacent cutting edge 71, provide for an accommodation of the excessive thermal expansion movements of expansion shim 80 in a horizontal direction without expansion shim 80 having the tendency to distort the horizontal placement of cutting edge 71 of cutting tip 70 with respect to workpiece 61, notwithstanding the fact that expansion shim 80 is specifically chosen to have a large thermal expansion movement vertically (in the drawings) so as to compensate for the lesser expansion movement (or different expansion movement vertically) of the cutting tip as clamped into holder 60 between movable clamping jaw 75 and clamping surface 62 under the uniform action of bolt 76.

Also, along the same lines and referring to FIGS. 15 and 16, it will be noted that FIG. 15 includes a milling head, somewhat similar to FIG. 9, comprising a carrying disc 95 having a plurality of abutments or bearing surfaces 96 around the periphery thereof, to each of which is fastened an expansion shim 100 as by means of pins 101. Also cutting tips 102, which are preferably in generally the form indicated in FIGS. 6 and 7, are clamped against expansion shims 100, and pins 101 are located close to or adjacent the cutting edge 103 of cutting tips 102.

In this milling head, cutting tips 102 are clamped in position against expansion shims 100 and abutments 96 by clamping bars 105, which are individually pivotally or swingably supported on a pin or pivot 106 to position them with respect to expansion shims 100. Thus, a threaded bore 107 is provided in clamping bars 105 into which is threadably engaged a screw or pin 108. Preferably, as a bearing reinforcement in this embodiment, discs 110 of hardened steel are provided in accommodating recesses 111 for the clamping bars 105, and the precise positioning of the cutting edges 103 of the cutting tips 102 are adjusted and maintained by threaded pins or set screws 112 engaging a threaded bore 113 for bearing against cutting tips 102.

While the methods and forms of apparatus herein described constitute the preferred embodiment of the inventions herein disclosed, it is to be understood that such inventions are not limited to the precise forms of apparatus shown or described, and that changes may be made therein without departing from the scope of the inventions herein described which are defined in the appended claims.

What is claimed is:

1. A cutting tool in which a substantial temperature rise is encountered in operation, comprising a cutting tip consisting of a first material and a cutting tip holder consisting of a different material having a different coefficient of thermal expansion than said first material, said holder having means forming spaced clamping jaws thereon for receiving said cutting tip therebetween, clamping means for urging said clamping jaws together into clamping position for clamping engagement of said cutting tip therebetween, the distance between said clamping jaws in said clamping position varying under thermal expansion of said holder as the temperature thereof varies in use, and shim means consisting of a material different from both said first material of said cutting tip and said different material of said tip holder, said shim means being inserted with said cutting tip between said clamping jaws, the thickness of said shim means and the thermal expansion characteristics of the material thereof being correlated with the thickness and thermal expansion coefficient of said first material of said tip for providing aggregate variations in the combined thicknesses of said cutting tip and said shim means corresponding to said variations in the distance between said clamping jaws in said clamping position thereunder thermal expansion of said holder for maintaining said cutting tip firmly clamped between said clamping jaws throughout substantial temperature variations in use and notwithstanding said different coefficients of thermal expansion as between said first material of said cutting tip and said different material of said holder, and at least one of said clamping jaws including heat conducting means for conducting heat generated in the operation of said cutting tool rapidly away from edge portions of said jaw contacting said cutting tip.

2. A cutting tool as recited in claim 1 in which but one of said clamping jaws is movable with respect to said holder and the other of said clamping jaws is stationary, and in which said shim is inserted between said cutting tip and said one of said clamping jaws which is stationary.

3. A cutting tool as recited in claim 1 in which the surface of said clamping jaws contacting said cutting tip is concave at room temperature for compensating for non-uniform heating and expansion in use resulting from the cooling effect of ambient air to which edge portions of said surface are subjected.

4. A cutting tool as recited in claim 1 in which said heat conducting means for conducting heat rapidly away from edge portions of said clamping jaw comprises a sheet metal insert of a metal of high thermal conductivity inserted in said clamping jaws and in direct heat-conducting surface contact therewith.

References Cited in the file of this patent

UNITED STATES PATENTS

| | | |
|---|---|---|
| 2,418,734 | Steffes | Apr. 8, 1947 |
| 2,704,881 | Barrett | Mar. 29, 1955 |
| 2,828,529 | Bryant | Apr. 1, 1958 |